US012363050B2

(12) United States Patent
Kalam et al.

(10) Patent No.: US 12,363,050 B2
(45) Date of Patent: Jul. 15, 2025

(54) INTERNET BANDWIDTH/DATA MANAGEMENT BY GATEWAY DEVICE (71) Applicant: DISH Network Technologies India Private Limited, Karnataka (IN)

(72) Inventors: Arun Pulasseri Kalam, Bangalore (IN); Vikram Balaraja Shetty, Bengaluru (IN); Hariprasanth Mohanraj, Bengaluru (IN)

(73) Assignee: DISH NETWORK TECHNOLOGIES INDIA PRIVATE LIMITED, Karnataka (IN)

( * ) Notice: Subject to any disclaimer, the term of this patent is extended or adjusted under 35 U.S.C. 154(b) by 420 days.

(21) Appl. No.: 17/536,702

(22) Filed: Nov. 29, 2021

(65) Prior Publication Data

US 2023/0171203 A1 Jun. 1, 2023

(51) Int. Cl.
*H04L 47/783* (2022.01)
*H04L 12/46* (2006.01)
*H04L 47/70* (2022.01)
*H04L 47/80* (2022.01)

(52) U.S. Cl.
CPC ............ *H04L 47/783* (2013.01); *H04L 12/46* (2013.01); *H04L 47/805* (2013.01); *H04L 47/821* (2013.01)

(58) Field of Classification Search
None
See application file for complete search history.

(56) References Cited

U.S. PATENT DOCUMENTS

| 8,612,612 | B1* | 12/2013 | Dukes | H04L 67/141 709/203 |
| 8,767,530 | B2* | 7/2014 | Yong | H04L 47/10 370/225 |
| 10,884,475 | B1* | 1/2021 | Wang | G06F 1/3296 |
| 11,863,465 | B1* | 1/2024 | Nijim | H04L 47/805 |
| 11,924,110 | B2* | 3/2024 | Mulkar | H04L 47/52 |
| 11,929,911 | B2* | 3/2024 | Swig | H04L 47/822 |
| 2004/0044770 | A1* | 3/2004 | Messick | H04L 9/40 709/226 |
| 2005/0013316 | A1* | 1/2005 | Liao | H04L 47/15 370/252 |
| 2008/0089237 | A1* | 4/2008 | Molen | H04L 47/10 370/252 |

(Continued)

*Primary Examiner* — Mariela Vidal Carpio
(74) *Attorney, Agent, or Firm* — Seed IP Law Group LLP (57) ABSTRACT Various embodiments of apparatus, systems (e.g., a gateway device) and/or methods are described for internet managing bandwidth and data usage. A category is assigned for each respective connected device in a stored list of the connected devices based on a function of each respective connected device. A priority list of the connected devices is created with regard to bandwidth use based on the category of the respective connected device. Bandwidth is provided to the connected devices based on the priority list. Also, a data reserve being less than a total recurring data cap is created. In response to determining a predefined data threshold has been met during a recurring period, non-critical functions of the connected devices are disabled for a remainder of the recurring period based on the priority list while allowing data communications with critical functions for the remainder of the recurring period.

18 Claims, 6 Drawing Sheets

(56) References Cited

U.S. PATENT DOCUMENTS

| | | | | |
|---|---|---|---|---|
| 2008/0192632 | A1* | 8/2008 | Bader | H04L 47/745 370/230.1 |
| 2011/0149875 | A1* | 6/2011 | Ahuja | H04L 47/828 370/329 |
| 2013/0238751 | A1* | 9/2013 | Raleigh | H04L 67/562 709/217 |
| 2013/0336229 | A1* | 12/2013 | Kakadia | H04W 72/535 370/477 |
| 2014/0003336 | A1* | 1/2014 | Padden | H04L 67/61 370/328 |
| 2014/0328382 | A1* | 11/2014 | Lee | H04N 19/187 375/240.01 |
| 2015/0003549 | A1* | 1/2015 | Kim | H04L 5/06 375/267 |
| 2017/0026980 | A1* | 1/2017 | Krishna | H04W 28/26 |
| 2018/0183684 | A1* | 6/2018 | Jacobson | H04L 41/145 |
| 2018/0219796 | A1* | 8/2018 | Fadle | H04L 47/24 |
| 2018/0261020 | A1* | 9/2018 | Petousis | G07C 5/0841 |
| 2019/0028475 | A1* | 1/2019 | Back | H04W 28/0268 |
| 2019/0149475 | A1* | 5/2019 | Martin | H04L 47/24 370/235 |
| 2019/0190848 | A1* | 6/2019 | Zavesky | H04L 47/83 |
| 2019/0222531 | A1* | 7/2019 | Lin | H04L 41/5022 |
| 2019/0258531 | A1* | 8/2019 | Tokuchi | G06F 9/451 |
| 2021/0204300 | A1* | 7/2021 | Hu | H04B 7/18513 |
| 2022/0014477 | A1* | 1/2022 | Ganesan | H04L 47/808 |
| 2022/0095166 | A1* | 3/2022 | Nunna | H04L 47/22 |
| 2022/0345412 | A1* | 10/2022 | Geng | H04L 67/10 |
| 2022/0386179 | A1* | 12/2022 | Dhammawat | H04W 28/24 |
| 2024/0323126 | A1* | 9/2024 | Zacharias | H04W 28/06 |
| 2024/0406305 | A1* | 12/2024 | Yamamoto | G09G 5/00 |

* cited by examiner

INTERNET BANDWIDTH/DATA MANAGEMENT BY GATEWAY DEVICE

BACKGROUND

The internet is a global system of interconnected computers and computer networks that use a standard internet protocol suite to communicate with each other. There are currently a growing demand for internet bandwidth at a particular location, such as a consumer's home. For example, computers and streaming devices consume a significant portion of internet bandwidth. Additionally, devices based on the Internet of Things (IoT) also consume internet bandwidth and this is likely at the same time as the computers and streaming devices. IoT is based on the idea that everyday objects, not just computers and computer networks, can be readable, recognizable, locatable, addressable, and controllable via an IoT communication network (e.g., an ad hoc system or the internet).

However, especially in many rural regions, data and internet bandwidth available may be limited and expensive. There is currently no system that effectively and efficiently handles bandwidth-consuming devices' (e.g., IoT devices, computers, devices streaming certain services (e.g., IP Live Linear services, IPVOD services, etc.) use of internet bandwidth and data, which can potentially cause problems. For example, because there are now multiple bandwidth-consuming devices in a home, certain devices using high bandwidth may leave the bandwidth for other more important devices (e.g., home security device) with low or no internet.

SUMMARY

Various embodiments described herein generally provide apparatuses, systems and methods to manage internet bandwidth and data usage of a home or business, especially to maintain certain critical functions or critical connected devices.

Generally, various embodiments of apparatuses, systems and/or methods are described for internet managing bandwidth and data usage. A category is assigned for each respective connected device in a stored list of the connected devices based on a function of each respective connected device. A priority list of the connected devices is created with regard to bandwidth use based on the category of the respective connected device. Bandwidth is provided to the connected devices based on the priority list. Also, a data reserve being less than a total recurring data cap is created. In response to determining a predefined data threshold has been met during a recurring period, non-critical functions of the connected devices are disabled for a remainder of the recurring period based on the priority list while allowing data communications with critical functions for the remainder of the recurring period.

According to one embodiment, a method includes storing a list of connected devices that are connected to a gateway device comprising a processor, where each connected device comprises a transceiver configured to communicate with the gateway device; assigning a category for each respective connected device in the list of the connected devices based on a function of each respective connected device; creating a priority list of the connected devices with regard to bandwidth use based on the category of the respective connected device; and providing bandwidth to the connected devices based on the priority list.

According to one embodiment, a method includes storing a list of connected devices that are connected to a gateway device comprising a processor; creating a priority list of the connected devices with regard to data use; creating a data reserve being less than a total recurring data cap; determining a predefined data threshold has been met for a recurring period; and in response to determining the predefined data threshold has been met during the recurring period, disabling non-critical functions of the connected devices for a remainder of the recurring period based on the priority list while allowing data communications with critical functions for the remainder of the recurring period.

According to one embodiment, a gateway device is provided that includes a processor and a storage medium for storing a priority list and instructions. The processor is configured, when executing the instructions, for: storing a list of connected devices that are connected to a gateway device; assigning a category for each respective connected device in the list of the connected devices based on a function of each respective connected device, wherein each connected device comprises a transceiver configured to communicate with the gateway device; creating a priority list of the connected devices with regard to bandwidth use based on the category of the respective connected device; and providing bandwidth to the connected devices based on the priority list.

BRIEF DESCRIPTION OF THE DRAWINGS

The same number represents the same element or same type of element in all drawings.

DETAILED DESCRIPTION OF EMBODIMENTS

The various embodiments described herein generally provide apparatus, systems and methods to manage internet bandwidth and data usage of a home or business, especially to maintain certain critical functions or critical connected devices.

Internet to a particular location (e.g. a home, business or other location) may be supplied by any source, such as an over-the-air or cellular network, a satellite or cable internet distribution system, or other communication networks. This internet feed is received by a gateway device, such as a router, at the location, such as a person's home. The gateway device then provides various devices, such as IoT devices, computers, streaming devices, and the like, in a home with internet.

As there are many connected devices which are constantly increasing, the availability of internet bandwidth for IoT devices and/or other devices (e.g., computers, streaming devices, etc.) should be managed, especially in areas where bandwidth may not be unlimited. Otherwise, there may not be enough bandwidth to properly operate all devices connected to a single gateway, especially devices which may have critical functions, such as a security system or a personal medical device. Indeed, a device should not fail to function properly due to non-availability of internet connection.

Generally, this can be done in multiple different ways, which are described herein according to various embodiments. In one embodiment, a gateway device which connects to smart devices and also which monitors the internet data consumption, manages the internet bandwidth provided to the IoT devices and/or other devices (e.g., computers, streaming devices, etc.). Once all the devices in a home or facility are connected to the gateway device, the gateway device categorizes these devices connected based on their category of function and creates priority list for the connected devices. Based on the category, a priority list (and optionally a second higher priority list (e.g., a top five list)) is prepared by the gateway device and can be changed based on the plan/requirement, etc. Then, the gateway device will provide internet bandwidth to the devices connected to the gateway device in accordance with the priority list. For example, for each of the devices in the priority list, the gateway device manages the bandwidth in that priority list (where for each of these devices, the bandwidth is greater than zero).

In one embodiment, if the list has some devices which consume a lot of data, then a low data communication/data exchange mode can be defined for that high-consuming device.

In some embodiments, a reserve data package is created to provide the priority devices data in a situation where the user is almost out of data for a recurring period, which is meant to keep the prioritized functions up and running, in one embodiment, and prioritized devices up and running in other embodiments. For example, once the user's connected devices have consumed almost the entire data package, bandwidth and data usage of all of the non-critical functions may be disabled while bandwidth and data usage of only the critical priority functions would be allowed to all for critically functioning. Similarly, as another example, once the user's connected devices have consumed almost the entire data package, bandwidth and data usage of all of the non-critical devices (i.e., devices in a non-critical category) may be disabled while bandwidth and data usage of only the critical priority devices would be allowed to all for critically functioning.

These and other embodiments will be described in more detail below with regard to FIGS. 1-6.

Figure 1:
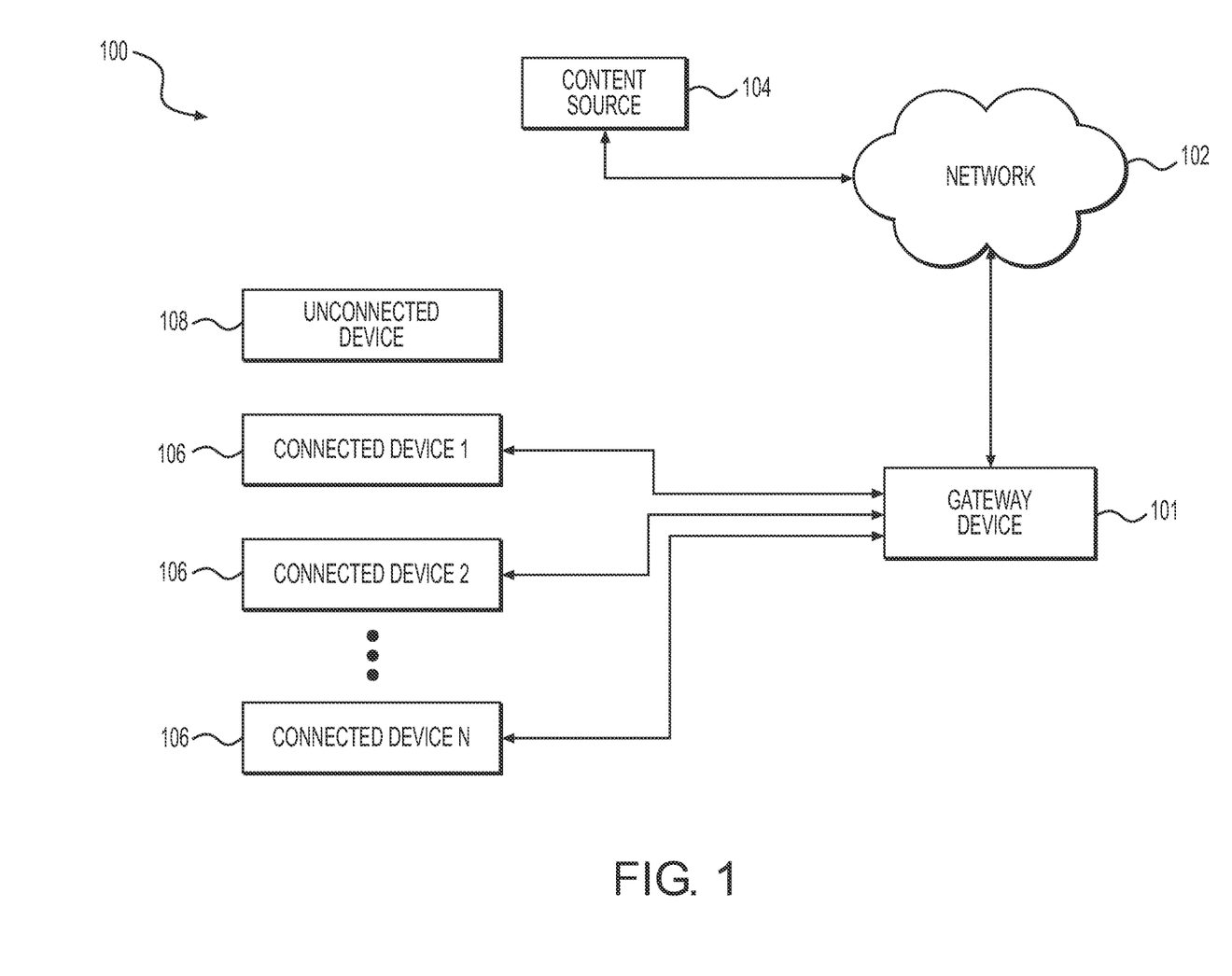
FIG. 1 illustrates an embodiment of a bandwidth/data use management system that includes a gateway device.

Starting first with FIG. 1, FIG. 1 illustrates an embodiment of a bandwidth/data use management system 100 for managing internet bandwidth/data usage. The bandwidth/data use management system 100 includes a gateway device 101, a network 102 and connected devices 106. These devices are discussed in more detail below.

The network 102 is a system that connects the various connected devices 106 in order to deliver over wired lines or wirelessly internet access to the gateway in one embodiment. The network 102 may comprise any type of communication network utilized between the gateway device 101 and the content provider 104. Exemplary communication networks include internet distribution networks (e.g., satellite and cable internet networks), wireless communication networks, public switched telephone networks (PSTN), and local area networks (LAN) or wide area networks (WAN) providing data communication services. The network 102 may utilize any desired combination of wired (e.g., cable and fiber) and/or wireless (e.g., cellular, satellite, microwave, and radio frequency) communication mediums and any desired network topology (or topologies when multiple mediums are utilized). The gateway device 101 may communicate with the transmission network 102 through a wired or wireless connection. The network 102 may distribute data signals in digital or analog form to the gateway device 101.

The bandwidth/data use management system 100 of FIG. 1 also includes a series of connected devices 106 that are connected to a single gateway device 101. FIG. 1 shows a number N of connected devices 106 (i.e., connected devices 1 to N). Each of the connected devices 106 could be any electronic device that uses the internet, such as smart appliances (e.g., refrigerators, dishwashers, etc.), wearables (e.g., smart watches, fitness trackers, etc.), security devices (e.g., smart door locks, baby monitors, cameras, security system, etc.), computing devices (e.g., computers, phones, scanners, printers, etc.), smart home devices (e.g., thermostats, televisions, home entertainment systems, Amazon Alexa devices, etc.), vehicles, and many other devices. In one embodiment, the connected devices 106 includes streaming devices that stream data using services such as IP Live Linear services (e.g., Sling TV®) and IPVOD services (e.g., Netflix®). It should be understood that the connected devices 106 should not be limited to IoT devices and the present invention is equally applicable to any other device which is configured to consume bandwidth. Regardless, each of the connected devices 106 also includes a transceiver to transmit and receive data to/from the gateway device 101.

As shown in FIG. 1, an unconnected device 108 is a device that is not connected to the gateway device 101 and thus, does not receive internet signals from the gateway device 101 (and instead may receive internet from another network, such as via a cellular connection (not shown)). The unconnected device 108 is not included in the list of connected devices 106 as used herein and thus, management of the bandwidth/data use does not include the unconnected device 108.

The gateway device 101 may be configured to receive content from one or more content sources 104 via network 102. In at least one embodiment, the gateway device 101 is a wireless router. In another embodiment, the gateway device 101 is a satellite or cable internet converter box combined with a router so that signals are received from an internet provider (via Satellite, Data Over Cable Service Interface Specification (DOCSIS), etc.), the signals are converted for use by the router, and the router then routes the signals to the connected devices 106 in accordance with embodiments of the present application. It is to be appreciated that the gateway device 101 may also be embodied as an apparatus combining the functionalities of one or more of: a router, display device, a set-top box, DVR, and/or an internet converter box.

The gateway device 101 is communicatively coupled to the connected devices 106 through any type of wired or wireless connection. Exemplary wired connections include Ethernet wiring, and exemplary wireless connections include WiFi and Bluetooth.

The gateway device 101 is discussed in more depth below with regard to FIG. 2.

The gateway device 101 is configured to receive data from a content source 104 and deliver such data to a presentation device (which could be one of the connected devices 106). The content source 104 may comprise any system or apparatus configured to provide presentation data, such as a video stream and audio stream, to a presentation device. Exemplary content sources include television distribution systems (e.g., over the air distribution systems, cable television distribution systems, satellite television distribution systems and broadband distribution systems), the internet, and the like.

Figure 2:
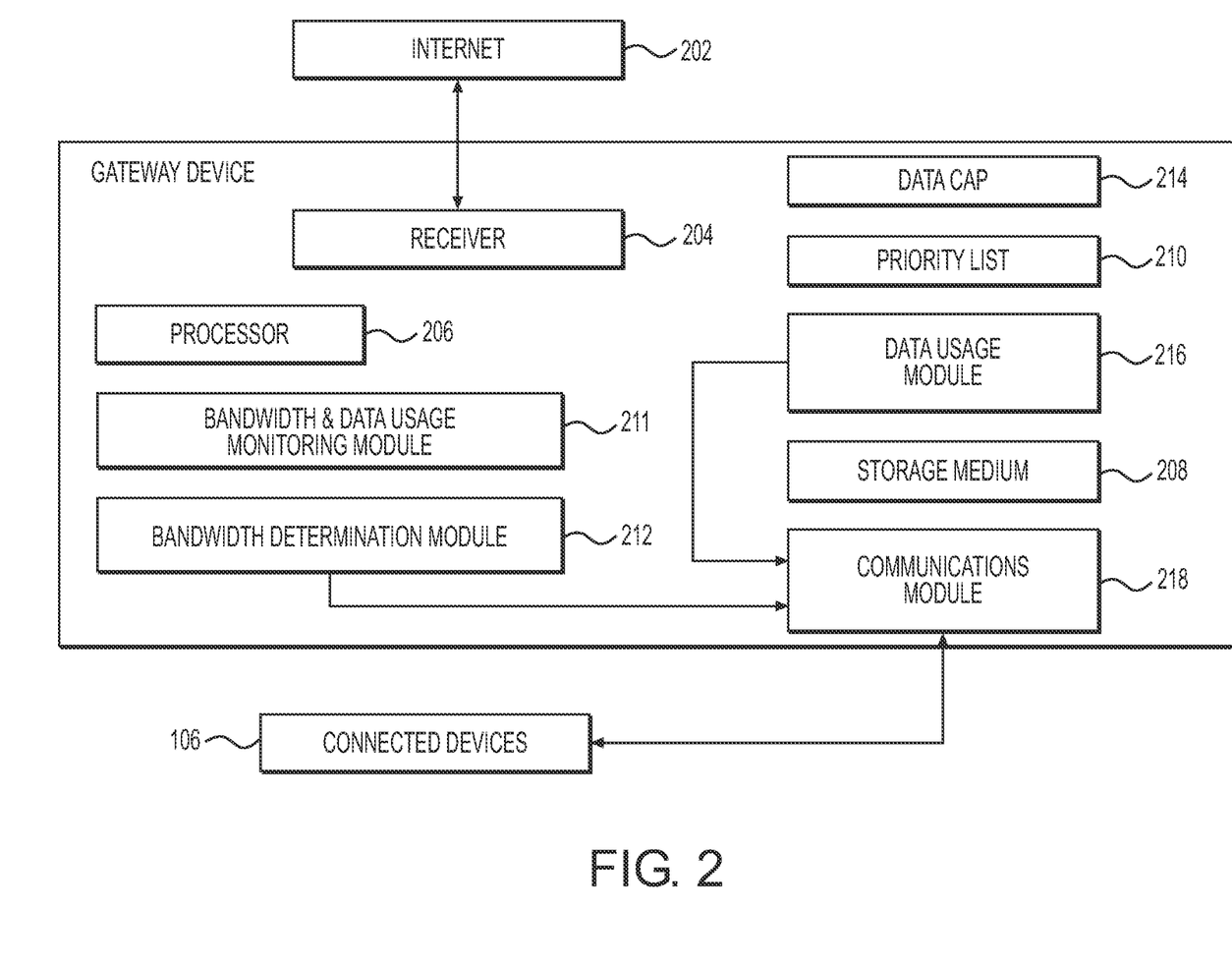
FIG. 2 illustrates an embodiment of a gateway device.

FIG. 2 illustrates an embodiment of the gateway device 101 of FIG. 1. The gateway device 101 comprises a receiver 204, a processor 206, a storage medium 208, a priority list 210, a bandwidth and data usage monitoring module 211, a bandwidth determination module 212, data cap 214, data usage module 216, and communications module 218. Each of these components is discussed in greater detail below.

The gateway device 101 receives the internet 202 feed at the receiver 204. The receiver 204 is a port on the gateway device 101 that receives data signals from a wired or wireless connection via network 102. These signals are then processed by the processor and software in the gateway device 101 to effectively receive the internet signals from network 102 so that they can be delivered to the connected devices 106.

The processor 206 may be a hardware processor (e.g., CPU) that is configured to execute instructions stored in storage medium 208. The processor 206 is configured to interact with each of the modules 211, 212, 216, 218 and stored data, such as priority list 210, data cap 214, and other software and/or data stored in the storage medium 208. For example, the processor 206 is configured to perform at least one or more or all of the steps presented herein, including those shown in FIGS. 3-6.

Any of the modules 211, 212, 216, 218 and other software modules or data may be stored in the storage medium 208. For example, the priority list 210 and data cap 214 may be stored on the storage medium 208. The storage medium 208 may be any type of temporary or persistent storage device capable of storing instructions and data. The storage medium 208 may be internal and/or external to the gateway device 101 and may include one or more storage devices. For example, the storage medium 208 may be an internal hard drive or flash memory.

The priority list 210 is data indicating a priority of the connected devices 106 connected to the gateway device 106. The priority list 210 is updated by the processor 206 each time a new device is connected to the gateway device 101, according to an embodiment. The priority list 210 includes a list of devices and an associated value with each device, in one embodiment. For example, the priority list 210 could be connected device 1, connected device 2 and connected device 3 (see FIG. 1) and priority values of 1, 1, 3, respectively, indicating that connected devices 1 and 2 are highest priority and connected device 3 is a third level of priority.

The bandwidth and data usage monitoring module 211 is a software module with instructions that are executed by the processor to monitor the current available bandwidth and the current bandwidth in use. The bandwidth and data usage monitoring module 211 provides this information to the bandwidth determination module 212 in order to determine the bandwidth to be delivered to the connected devices 106. The bandwidth and data usage monitoring module 211 also monitors the current data usage of all connected devices during a recurring time period (e.g., a month) and thus, the total data usage by the gateway device 101 for that recurring time period. After the recurring time period, the bandwidth and data usage monitoring module 211 resets the data usage back to zero and starts tallying the data usage again until the recurring time period expires again. The bandwidth and data usage monitoring module 211 has instructions that, when executed by the processor 206, performs one or more of the steps of FIGS. 3-6. The bandwidth and data usage monitoring module 211 provides the data usage information to the data usage module 216, which is discussed later herein.

The bandwidth determination module 212 determines when the bandwidth needs or requests of the connected devices 106 exceed the available bandwidth (or is otherwise at a level where the bandwidth should be disabled for certain connected devices/functions) in some embodiments, and in this situation the bandwidth determination module 212 determines which of the connected devices/functions should receive internet bandwidth and which connected devices/functions should not receive internet bandwidth. This process is discussed in more depth later herein with regard to FIGS. 3 and 5.

The data usage module 216 determines when the data usage needs exceed the data cap or a predetermined threshold in some embodiments, and as such, the data usage module 216 determines which of the connected devices/functions is allowed (via the gateway device 101) to send/receive data and which devices/functions is disallowed (via the gateway device 101) to send/receive data. This process is discussed in more depth with regard to FIGS. 4 and 6.

The communications module 218 communicates with the bandwidth determination module 212 and the data usage module 216 to deliver internet bandwidth and allow/disallow data usage to the connected devices 106. This may be done wirelessly over a short range network, such as WiFi or Bluetooth, or via a wired connection. The bandwidth determination module 212 and the data usage module 216 will send to the communications module 218 the connected device ID as well as a flag for each respective connected device as to whether bandwidth is not permitted for such connected device 106 and another flag for each respective connected device 106 if data usage is permitted, according to some embodiments. Additionally, for each connected device 106 for which bandwidth or data usage will be limited, the connected device 106 bandwidth and/or data usage will be limited as a percentage of data or bandwidth that normally would be delivered to such device.

At the time that bandwidth is ready to be delivered to all connected devices, the communications module 218 looks up the data about the limited connected device 106 sent by modules 211,212, 216, 218 to determine what flags are set and will reduce the bandwidth the connected devices 106 indicated to receive limited bandwidth/data usage. In this regard, the communications module 218 is configured to reduce or disable the bandwidth and/or data usage performed for each connected device 106 indicated as a limited connected device by the bandwidth determination module 212 and/or the data usage module 216. On the other hand, for those devices which are not marked as connected devices 106 which should be limited, the communications module 218 delivers bandwidth without limitation until the system determines a bandwidth or data usage limitation should be applied.

Figure 3:
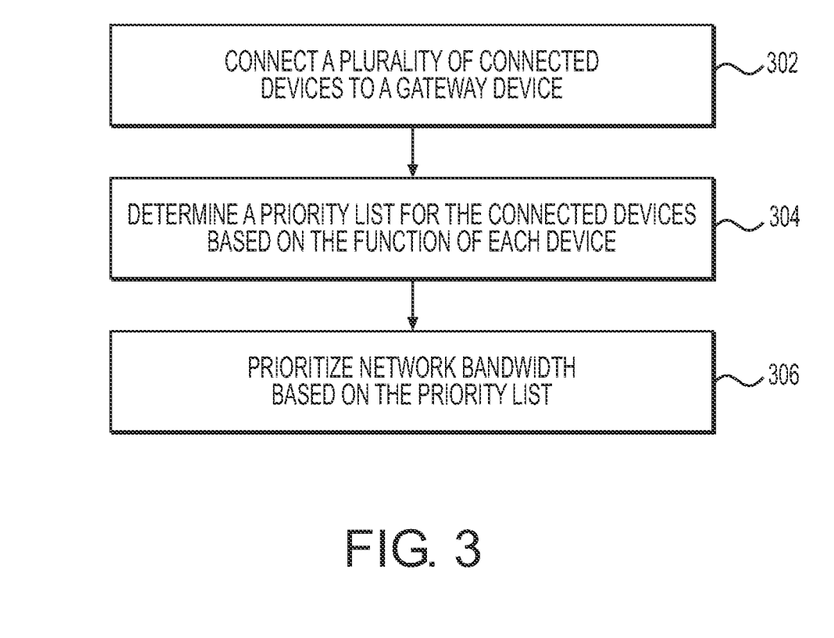
FIG. 3 illustrates a method of managing internet bandwidth according to some embodiments.
Figure 4:
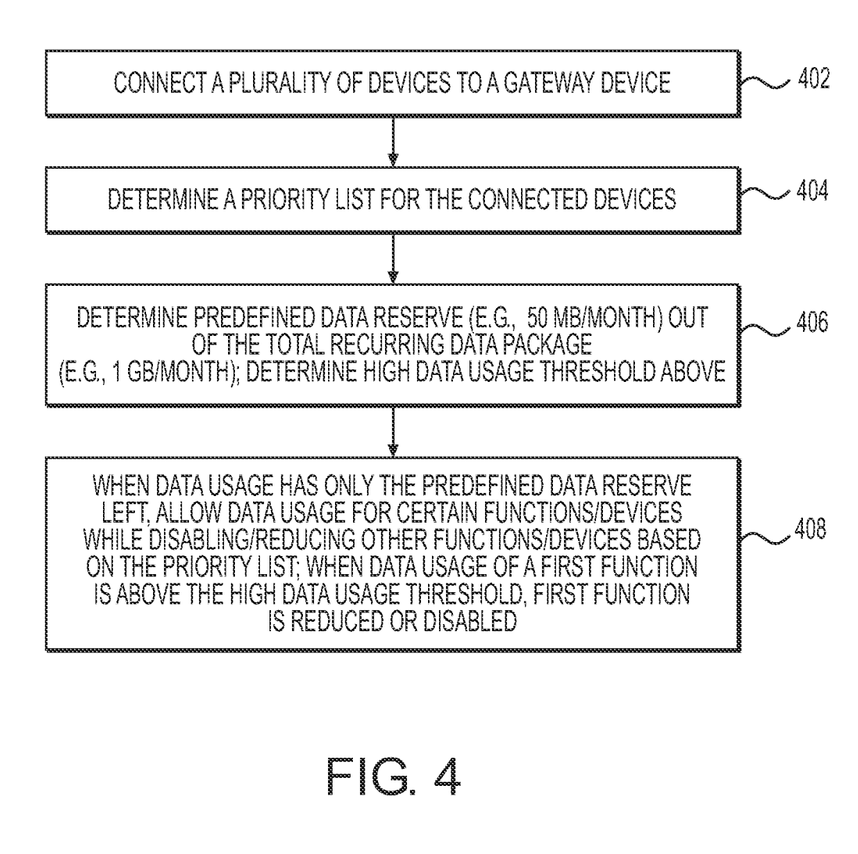
FIG. 4 illustrates a method of managing data usage according to some embodiments.
Figure 5:
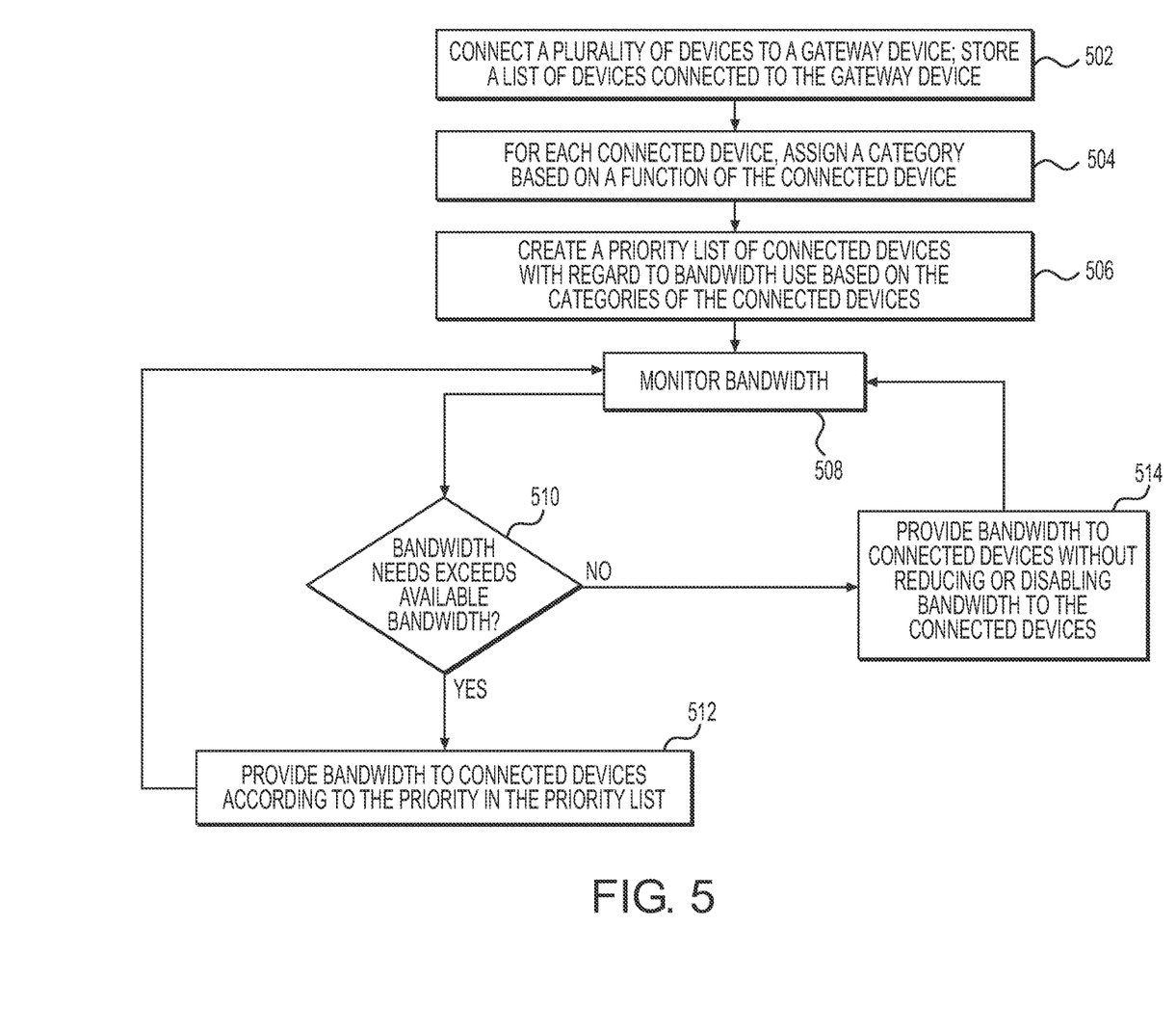
FIG. 5 illustrates a method of managing internet bandwidth according to some embodiments.
Figure 6:
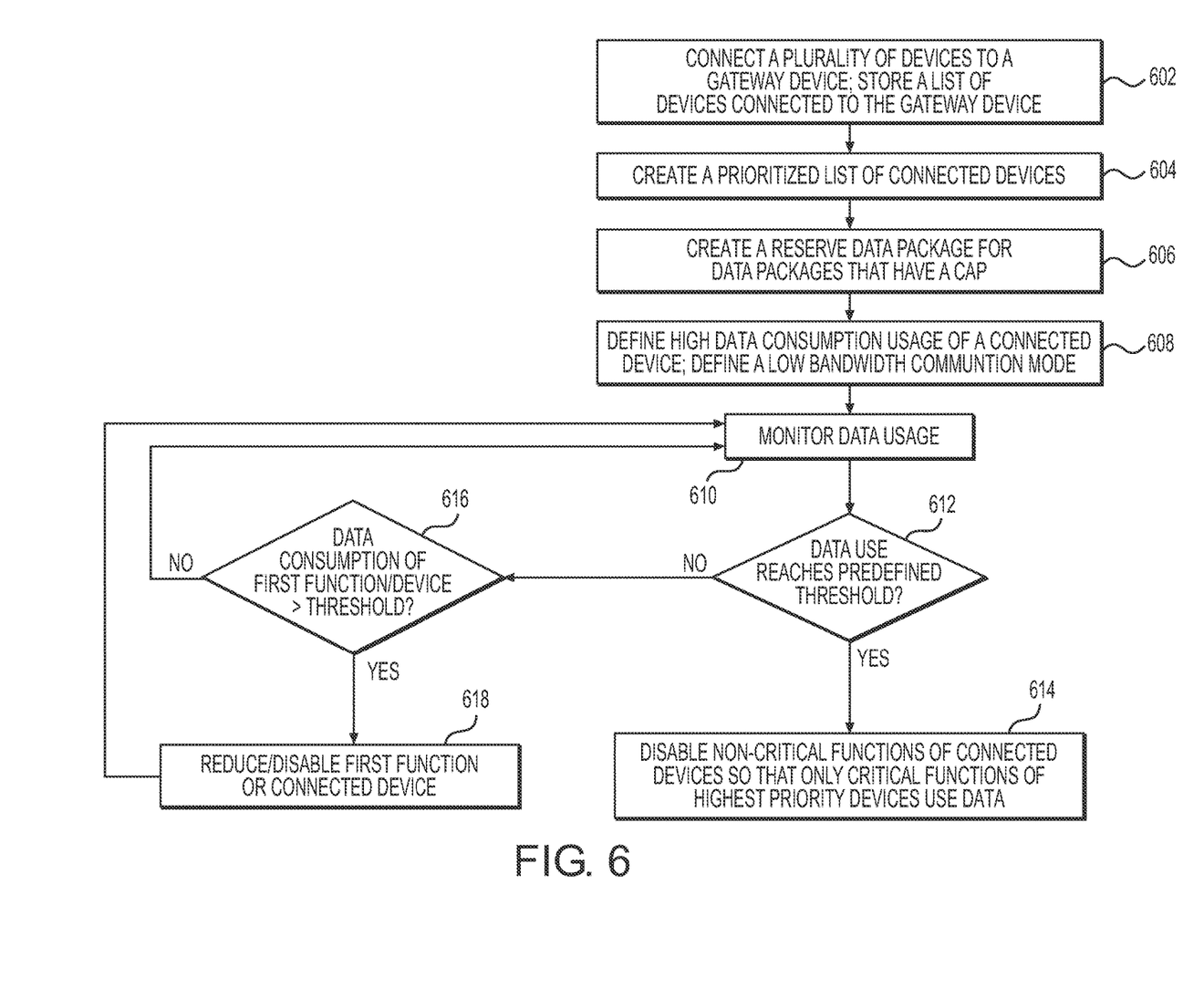
FIG. 6 illustrates a method of managing data usage according to some embodiments.

The above description is a general overview, more details of these embodiments as well as additional embodiments are described below with reference to FIGS. 3-6. FIGS. 3 and 5 are directed to bandwidth management which FIGS. 4 and 6 are directed to data usage management, according to some embodiments.

FIG. 3 illustrates, generally, a method of managing internet bandwidth according to some embodiments. In one embodiment, FIG. 3 addresses a situation where a data bandwidth (for example, a 10 Mbps connection) has dropped below a predefined threshold (e.g., reduced to 100 Kbps) due various reasons, such as issues related to infrastructure, peak load, weather, etc.

In block 302, the connected devices 106 are connected to the gateway device 101. This is done by a pairing process so that the connected devices 106 are connected to the gateway device 101 in order to transfer communications from the connected devices 106 to the network 102 via gateway device 101. Any number of connected devices 106 may connect to the gateway device 101 and the connected devices 106 may continually be added or dropped from the gateway device 101.

In block 304, the priority list 210 of connected devices is determined based on a function or category of the device or based on other predefined criteria, in some embodiments. In some embodiments, the priority list 210 could be manually inputted by a user or manufacturer and can be modified at any time. In this regard, in block 306, the system then will prioritize network bandwidth based on the priority list 210. In some embodiments, for example, the system will determine when there is a low data bandwidth condition or when the bandwidth should be throttled in order to keep certain functions (e.g., critical functions, functions desired by the user, etc.) or certain devices 106 running, and when the bandwidth is determined to be lower than a threshold required to keep the all the functions and connected devices 106 functioning properly (or as desired), the gateway device 101 will decide which top connected devices 106 (or functions of such top connected devices 106) according to the priority list 210 should continue to function and which lower priority connected devices (or functions of such connected devices) should be disabled or reduced. For example, the system could drop performance of certain connected devices 106 to keep them functional, such as a closed captioned TV camera would drop from 1080p video to 360p video.

FIG. 4 illustrates, generally, a method of managing data usage according to some embodiments. In this scenario of FIG. 4, there is enough bandwidth, but the connected devices 106 have consumed most of the data in the data cap 214 in the recurring period reaching a situation where the internet data availability is going to be interrupted (i.e., when the data cap is reached). In at least one embodiment, a data cap 214 for a recurring period is a maximum data limit for an internet account that the user's connected devices 106 are allowed to consume during such recurring period and the network 102 will no longer deliver data to the gateway device 101 after the data cap 214 is reached. For example, for a 1 GB data cap 214, this means the individual's devices can consume up to, but no more than, 1 GB data in a month. So once the 1 GB limit is hit, the network 102 not only stops the streaming service to the gateway device 101 but also all the critical connected devices 106. This can be overcome by monitoring the data consumption and dynamically planning for the reserve data package, where a reserve data package is a reserved data amount which is reserved for the critical connected devices 106 to use when a data threshold (which is less than the data cap 214) is met to keep the critical connected devices 106 up and running, as is explained below with regard to FIG. 4. For example, for the 1 GB data cap, the reserved data amount may be 50 MB which is reserved for only critical functions or critical devices.

Blocks 402 and 404 are similar to blocks 302 and 304 of FIG. 3, respectively. For example, in block 402, the connected devices 106 are connected to the gateway device 106, and in block 404, the priority list of connected devices is determined based on a function or category of the device or based on other predefined criteria, in some embodiments.

In block 406, a predefined data reserve is determined out of the total recurring data package based on a daily data reserve threshold. For example, out of a total monthly data package of 1 GB/month, if the data reserve threshold of 1 MB/day is the data required per day to keep the critical connected devices 106 to work, then on the first day of the month, 30 MB/month of data from the 1 GB data package will be determined by the system as the data reserve (also referred to herein as the "reserve data package").

In some embodiments, the reserve data package reserves bandwidth for certain applications within a particular connected device(s) 106. For example, the system may reserve bandwidth for a user's phone for a weekly internet phone call (Facetime®) to her parents or for an important recurring (e.g., weekly, daily, monthly, etc.) video conference meeting on the user's laptop. This may be manually set up by the user in one embodiment, by the user identifying a particular connected device 106 (e.g., by name, by MAC address, by IP address, etc.), identifying functions the particular connected device 106 is capable of performing, and assigning a certain amount of data per period to one of the identified functions of the particular connected device 106. In another embodiment, the system may identify certain functions that are performed by the user on a periodic basis and automatically ask the user (via a GUI) as to whether those functions should have bandwidth reserved in the reserve data package based on the periodic usage of the user of such function.

In another embodiment, the reserve data package may also be variable so that certain connected devices 106 or functions of the connected devices 106 only are allowed to consume the reserved data during certain predefined times. For example, the reserve data package have different priority levels for different devices based on a predefined timing (e.g., only for a particular time period of day, only for a particular day(s) of week/weekend, etc.) and the priority level can automatically shift up or down based on this timing. For example, a baby camera may be a priority level 1 from 9 pm to 6 am, but then would be a priority level 4 at all other times for the purposes of determining bandwidth reservation. The reserve data package would only allow usage for certain predefined priority levels. The reserve data package would provide the reserved data for the predefined priority levels while not allowing data usage for other priority levels or significantly reducing bandwidth usage for each successive priority level. In the above example, if the user defined that only priority levels 1 and 2 are allowed to receive bandwidth after the predetermined data usage has been exhausted, the reserve data package would allow the baby monitor to consume data between 9 pm and 6 am because it was at priority level 1 which is within the predefined levels 1 and 2 but disallow internet bandwidth usage at all other times of the baby monitor because it was at priority level 4 which is lower than predefined levels 1 and 2.

In block 408, when the data usage has only the predefined data reserve left, the data usage for certain functions or certain connected devices 106 are allowed to use the reserve data package, on the first day, the system will release 1 MB of data from the reserve data package to main data package, i.e. 5 days after the start of a recurring period, the reserve data package will have only 25 MB reserve instead and 29 days after the start of a recurring period, it will have only 1 MB of data. This ensures the continuity of all critical functions, but also with very minimal impact on the total data usage of the entire data package. In both cases, the user will have autonomy to change the overall limits to have it more customized for the requirement and preferences.

Also, referring back to block 406, the system determines a high data usage threshold. If a connected device 106 uses above such high data usage threshold, the system determines that such connected device 106 is consuming too much data and thus, should be limited. As such, the system determines the high data usage threshold and this determination can be based on a percentage of the total data cap package, a user-defined threshold, a number of connected devices 106 and/or a split of the total data cap package, or any combination thereof.

Also, referring back to block 408, when the data usage of a first function (or first connected device 106) is above the high data usage threshold, the first function is reduced or disabled (or data usage of the first connected device 106 is reduced or disallowed).

FIGS. 3 and 4 provide general overviews of several embodiments, and more details of such several embodiments (and other embodiments) are described below with regard to FIGS. 5 and 6, respectfully.

FIG. 5 illustrates a method of managing internet bandwidth according to some embodiments. Blocks 502 and 504 are similar to blocks 302 and 304 of FIG. 3, respectively. Starting first in block 502, the connected devices 106 are connected to the gateway device 106, Additionally, a list of connected devices 106 is created and stored on the gateway device 101 (or on a server or other computer). When each additional device becomes connected to the gateway device 101, the list of connected devices 106 is then updated and the system includes this additional connected device in the method.

In block 504, a function or category of the device is determined and assigned to each of the connected devices, in some embodiments. The category of functions may be security devices, wearables, appliances, vehicles, computers/mobile phones, internet phones, entertainment, and the like, according to some embodiments. These categories could be determined based on a category/function identifier received by the gateway device, a manual entry of the function or category for any connected device, or by other means. In this regard, the category can help to identify critical connected devices as compared with the other connected devices 106. For example, the connected devices 106 in the security category/function (or connected devices 106 manually identified as critical) could be identified to have a higher (or highest) priority relative to all other connected devices.

In block 506, the priority list 210 of connected devices 106 is determined based on a function or category of the connected device 106 or based on other predefined criteria, in some embodiments. In this regard, for each of the connected devices 106, the system assigns a priority for each of the connected devices 106 based on their category of function and creates the priority list 210 based on such priorities. The priorities can be determined in any manner. For example, the priorities could be a sequential priority so that is a different sequential value is assigned for each connected device. For example, for three connected devices, the priorities could be assigned values of a "1" for a first connected device for a top critical device (top priority), a "2" for a second connected device (priority after the top priority but greater than the lowest priority), a "3" for a third connected device (lowest priority) and so on. In this regard, there is only one device in each priority.

In another embodiment, the priorities could be assigned as priority categories where multiple connected devices 106 could be within each of the priority level. For example, there could be priority categories of 1-5 and connected devices 1 and 2 are assigned in the priority category of "1" (which would be identified as top critical devices), connected device 3 is assigned in the priority category of "2", connected devices 4-5 are assigned in the priority category of "3", connected devices 6-8 are assigned in the priority category of "4", connected device 9 is assigned in the priority category of "5", and so forth, as shown in TABLE 1 below:

TABLE 1

Priority List

| Connected Device(s) (ID) | Priority Value | Function/Category |
| --- | --- | --- |
| 1, 2 | 1 | fire alarm; security alarm, |
| 3 | 2 | smart door lock |
| 4, 5 | 3 | appliance; baby monitor |
| 6, 7, 8 | 4 | wearable device, thermostat; home entertainment system |
| 9 | 5 | vehicle |

In this regard, there could be multiple devices in the top priority category and would equally share available bandwidth assigned for the top priority device prior to lower priority categories. For example, for category 1, the fire alarm and security alarm have the same priority which is the highest priority and would get bandwidth priority over all other connected devices.

It should be noted that the present application can prioritize critical devices and can prioritize critical functions. Indeed, in some embodiments, the priority list of critical devices is prioritized so that bandwidth/data use for the whole device is disabled or reduced. Indeed, in some embodiments, the priority list of critical functions is prioritized so that bandwidth/data use for just that function for that device is disabled or reduced and other functions of that device may be still enabled.

The priority list 210 could be stored in a storage medium 208 or in a database (not shown). The priority list 210 identifies, for each connected device, its connected device ID in an entry in association other data for that connected device. For example, in each entry in the priority list 210 (where each entry is for a different connected device 106), the connected device ID, a priority value, a function/category and other data may be stored for each connected device 106. There are multiple entries in the priority list 210 so that the overall priorities for all connected devices 106 are determined.

This priority list 210 is updated on a real time basis when a new connected device is connected to the gateway device 101 (and also when a connected device 106 is disconnected as well). For example, when the gateway device 101 connects a new connected device 106, the gateway device 101 may then add a new entry immediately to the priority list 210 with the newly-connected device 106 and its priority value.

In block 508, the bandwidth is monitored by the system to determine the available bandwidth out of the total bandwidth. This is detected by continuous monitoring of the bandwidth using applications like OOKLA which helps to test the bandwidth available.

In block 510, the bandwidth available is compared with the bandwidth needs of the connected devices 106 and if the bandwidth needs are less than the bandwidth available or the predetermined threshold, the method may provide the bandwidth without limiting the bandwidth to the connected devices 106 in block 514 and then continue monitoring the bandwidth available in block 508.

Conversely, if the bandwidth needs of the connected devices 106 are greater than or equal to the bandwidth available or a predetermined threshold, the method may continue to block 512. In block 512, the bandwidth is reduced or disabled for connected devices 106 according to the priority in the priority list 210. To do this, the system will first provide bandwidth to all connected devices 106 requesting bandwidth. Then, the gateway device 101 will check to determine if the first connected device 106 with a top priority value is receiving the bandwidth it is requesting/needing. If not, the gateway device 101 will go to the least priority connected device(s) 106 (i.e., the connected device(s) with the lowest priority value(s)) that have bandwidth and take bandwidth from such low priority device(s) and send that bandwidth to the top priority connected device 106 and continue to do this until the top priority connected device 106 succeeds in having proper bandwidth to function.

If the first connected device 106 with the top priority value has indicated that the bandwidth is proper (based on the test from the gateway device 101), then the gateway device 101 will go to the next connected device 106 with the next lowest or equal priority (from the highest priority connected device). The gateway device 101 will then determine if the next highest priority connected device 106 has proper internet bandwidth and repeat the above steps including going to the least priority connected device(s) 106 that still have bandwidth and take bandwidth from such low priority device(s) 106 and send that bandwidth to the next highest priority connected device 106 and continue to do this until the next highest priority connected device succeeds in having proper bandwidth to function. This process continues until all connected devices 106 are processed or until all bandwidth is used by the highest priority connected devices 106.

After and/or during execution of block 512, the method may continue back to block 508 so that blocks 508-514 are continually repeated to continually monitor the bandwidth and deliver the total bandwidth to only the highest priority devices 106 sacrificing bandwidth from the lowest priority devices to provide full bandwidth to the critical devices/functions.

FIG. 6 illustrates a method of managing data usage according to some embodiments. Blocks 602 and 604 are similar to blocks 402 and 404 of FIG. 4, respectively. Starting first in block 602, the connected devices 106 are connected to the gateway device 101, Additionally, a list of connected devices 106 is created and stored on the gateway device 101 (or on a server or other computer). When each additional device becomes connected to the gateway device 101, the list is then updated and the system includes this additional connected device in the method.

In block 606, a predefined data reserve is created out of the total recurring data package based on a daily data reserve threshold, as explained above with regard to block 406 of FIG. 4. As the above example explained, out of a total monthly data package of 1 GB/month, if the data reserve threshold of 1 MB/day is the data required per day to keep the critical connected devices to work, then on the first day of the month, 30 MB/month of data from the 1 GB data package will be determined by the gateway device 101 as the data reserve that is to be reserved for critical devices 106 and functions for every month. If the data reserve reaches 970 MB on the first day of a particular month, the gateway device 101 will reduce or disable the data usage of all other devices 106 except the critical connected devices 106 so that the critical functions can continue and all other functions do not use more data in the data package. It should be appreciated that such reserve is only for data packages that have a data cap 214, in one embodiment.

In another embodiment, when a connected device 106 is consuming a high amount of data (i.e., data above a predefined threshold for a predefined amount of time), this device 106 should be limited so that it does not take too much data on the data package for the recurring period (e.g., month). As such, under block 608, a high data consumption usage threshold for any connected device 106 or a function of any connected device 106 is defined. In this regard, if a device 106 has consumed 900 MB in a month and this is determined to be above a threshold of 800 MB/month, then the gateway device 101 will reduce the data usage of such device 106. This can be done by defining a low bandwidth/communication mode which is explained in more detail below.

The low bandwidth/communication mode is a mode where the gateway device 101 can determine which functions can be reduced to save bandwidth and/or data usage. Specifically, certain functions are functions that can be altered or shifted to another similar function so that less data is consumed but the purpose of such function is still achieved. For example, for closed captioned TV, the gateway device 101 could reduce the resolution from 1080p to 360p thereby still allowing the closed captioned TV to function properly but also save bandwidth and data usage. These functions can be predefined in the storage medium 208 by a user or a manufacturer in some embodiments. In another embodiment, the user can be prompted when a function is using a high data rate or high amount of data overall to provide options for the device 106 to be changed to save bandwidth and data usage.

In block 610, the data usage is monitored by the gateway device 101. In one embodiment, the gateway device 101 starts a counter at the beginning of each recurring period and determines how much data is sent between each connected device 106 and network 102 using gateway device 101. Since all data from network 102 must go through the gateway device 101, the gateway device 101 can keep a running total of how much total data is received from the network 102 as well as how much data usage has been consumed during the period for each respective connected device 106. After the end of the recurring period, the counter may be reset.

In decision block 612, the gateway device 101 determines if the data usage (for the current period) has reached the predefined threshold (where the predefined threshold is discussed above with regard to block 606). This is done by comparing the predefined threshold which has been stored in the storage medium 208 with the actual data consumption for the recurring period on a real time basis as counted by the gateway device 101.

In block 614, if the determined data usage has reached the predefined threshold for the current period, the non-critical functions of devices 106 are disabled so that only critical functions of the highest priority connected devices 106 use data. In one embodiment, data for the non-critical functions of devices 106 are reduced so that data usage is significantly reduced. In at least one embodiment, some functions of critical devices 106 may be disabled while other functions of the critical devices 106 may be permitted.

If the determined data usage has not reached the predefined threshold for the current period, the method may proceed to decision block 616. In block 616, data consumption of any function or any device is determined as to whether such data consumption is greater than a high data usage threshold. As mentioned above, the high data usage threshold can be set by the user, a manufacturer or can be dynamically determined by the gateway device relative to the data package cap (e.g., 5%, 10%, 15% etc. of data package cap) or greater than a historical use by the device in the previous periods.

Regardless, if the data consumption of any function or any connected device 106 is determined to be greater than the high data usage threshold, the gateway would not provide bandwidth or allow data usage for that function or that connected device 106 or the gateway would reduce data use or bandwidth for such function or connected device 106, as provided in block 618.

After blocks 614 and 618 and while decision blocks 610-618, the data usage is continually monitored at block 610 and blocks 610-618 are repeated.

The above methods and systems provide an advantage of data usage and bandwidth for critical functions of connected devices so that at a minimum, these critical functions/devices operate even in rural areas, poor weather conditions or other situations where bandwidth is limited and also in situations where data package caps make wise usage of data needed.

Although specific embodiments were described herein, the scope of the invention is not limited to those specific embodiments. The scope of the invention is defined by the following claims and any equivalents therein.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present disclosure has been presented for purposes of illustration and description, but is not intended to be exhaustive or limited to embodiments of the disclosure in the form explicitly disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet Service Provider).

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method comprising:
   establishing, by a gateway, a plurality of communication connections with a plurality of connected devices, respectively, the plurality of connected devices being associated with a plurality of device identifiers, respectively;
   receiving a plurality of device function identifiers associated with the plurality of connected devices, respectively;
   accessing a predefined criterion of the gateway that assigns a plurality of priorities to the plurality of device function identifiers, respectively;
   creating a priority list for the plurality of connected devices with regard to bandwidth use, the priority list associating a device identifier of the plurality of device identifiers with a priority of the plurality of priorities, creating the priority list including determining the priority associated with the device identifier to be the priority assigned by the predefined criterion to a device function identifier of the connected device, the device function identifier identifying a function of the connected device;
   providing bandwidth to the plurality of connected devices in accordance with the priority list;
   determining whether a total data usage of the plurality of connected devices for a current period exceeds a total data use threshold; and
   in response to determining that the total data usage does not exceed the total data use threshold,
      refraining from disabling data usage functions of the plurality of connected devices for the current period;
      determining whether a first data usage of a first connected device of the plurality of connected devices for the current period exceeds a data use threshold for the first connected device, wherein the first connected device has a highest priority of the plurality of priorities; and
      in response to determining that the first data usage of the first connected device for the current period exceeds the data use threshold, disabling or throttling down a first data usage function of the first connected device for the current period.

2. The method of claim 1, further comprising:
   determining available bandwidth;
   determining a collective bandwidth need for the plurality of connected devices; and
   providing bandwidth to the plurality of connected devices, respectively, based on the priority list in response to the available bandwidth being less than the collective bandwidth need.

3. The method of claim 1, further comprising:
   storing, by the gateway, a list of the plurality of device identifiers, wherein the plurality of connected devices includes internet of Things (IoT) devices that use internet bandwidth.

4. The method of claim 3, wherein an IoT device of the IoT devices is a smart home security device, a smart appliance, a smart home device, or a smart fire alarm.

5. The method of claim 1, further comprising:
   setting a reserve data package out of a total data package provided for the gateway.

6. The method of claim 5, further comprising
   determining a data threshold that is less than the reserve data package; and
   in response to a current data usage within a recurring period being greater than or equal to the data threshold, disabling non-critical functions once the data threshold is met for the recurring period while allowing data communications with critical functions, wherein the non-critical functions are functions that have a priority level less that the critical functions, and wherein the critical functions are functions that have a highest priority level.

7. The method of claim 1, further comprising:
   reducing bandwidth or data communications for connected devices that use data above a threshold amount or above a predefined data consumption rate.

8. The method of claim 1, wherein the plurality of connected devices are each associated with only one device function identifier.

9. The method of claim 8, wherein the device function identifier of the connected device is a fire alarm, security alarm, smart door lock, appliance, baby monitor, wearable device, thermostat, home entertainment system or vehicle.

10. A gateway device comprising:
    a processor;
    a storage medium for storing a priority list and instructions that, when executed by the processor, cause the processor to:
       establish a plurality of communication connections, a communication connection of the plurality of communication connections being established with a connected device of a plurality of connected devices, a connected device of the plurality of connected devices being associated with a device identifier of a plurality of device identifiers;
receive a plurality of device function identifiers for the plurality of connected devices;
create the priority list for the plurality of connected devices with regard to bandwidth use, the priority list associating a device identifier of the plurality of device identifiers with a priority of a plurality of priorities, creating the priority list including determining the priority associated with the device identifier to be the priority assigned by the predefined criterion to a device function identifier of the connected device, the device function identifier identifying a function of the connected device;
provide bandwidth to the plurality of connected devices based on the priority list;
determine whether a total data usage of the plurality of connected devices for a current period exceeds a total data use threshold; and
in response to determining that the total data usage does not exceed the total data use threshold,
refrain from disabling data usage functions of the plurality of connected devices for the current period;
determine whether a first data usage of a first connected device of the plurality of connected devices for the current period exceeds a data use threshold for the first connected device, wherein the first connected device has a highest priority of the plurality of priorities; and
in response to determining that the first data usage of the first connected device for the current period exceeds the data use threshold, disable or throttle down a first data usage function of the first connected device for the current period.

11. The gateway device of claim 10, wherein the instructions, when executed by the processor, cause the processor to:
determine an available bandwidth;
determine a collective bandwidth need for the plurality of connected devices; and
provide bandwidth to the plurality of connected devices based on the priority list in response to the available bandwidth being less than the collective bandwidth need.

12. The gateway device of claim 10, wherein the instructions, when executed by the processor, cause the processor to:
store a list of the plurality of device identifiers, wherein each connected device of the plurality of connected devices uses internet bandwidth.

13. The gateway device of claim 10, wherein the instructions, when executed by the processor, cause the processor to:
set a reserve data package out of a total data package provided for the gateway device.

14. The gateway device of claim 13, wherein the instructions, when executed by the processor, cause the processor to:
determine a data threshold that is less than the reserve data package; and
in response to a current data usage within a recurring period being greater than or equal to the data threshold, disable non-critical functions once the data threshold is met for the recurring period while allowing data communications with critical functions.

15. The gateway device of claim 10, wherein the instructions, when executed by the processor, cause the processor to:
reduce bandwidth or data communications for connected devices that use data above a threshold amount or above a predefined data consumption rate.

16. The gateway device of claim 10, wherein the instructions, when executed by the processor, cause the processor to:
create the list of the plurality of connected devices, wherein the plurality of connected devices includes internet of Things (IoT) devices that use internet bandwidth, wherein the IoT devices are selected from a smart home security device, a smart appliance, a smart home device, or a smart fire alarm.

17. The gateway device of claim 10, wherein the plurality of connected devices are each associated with only one device function identifier.

18. The gateway device of claim 17, wherein the device function identifier of the connected device is a fire alarm, security alarm, smart door lock, appliance, baby monitor, wearable device, thermostat, home entertainment system or vehicle.

* * * * *